(No Model.)  5 Sheets—Sheet 1.
J. HALL.
MACHINE FOR TREATING HIDES, SKINS, OR LEATHER.
No. 599,331.  Patented Feb. 22, 1898.
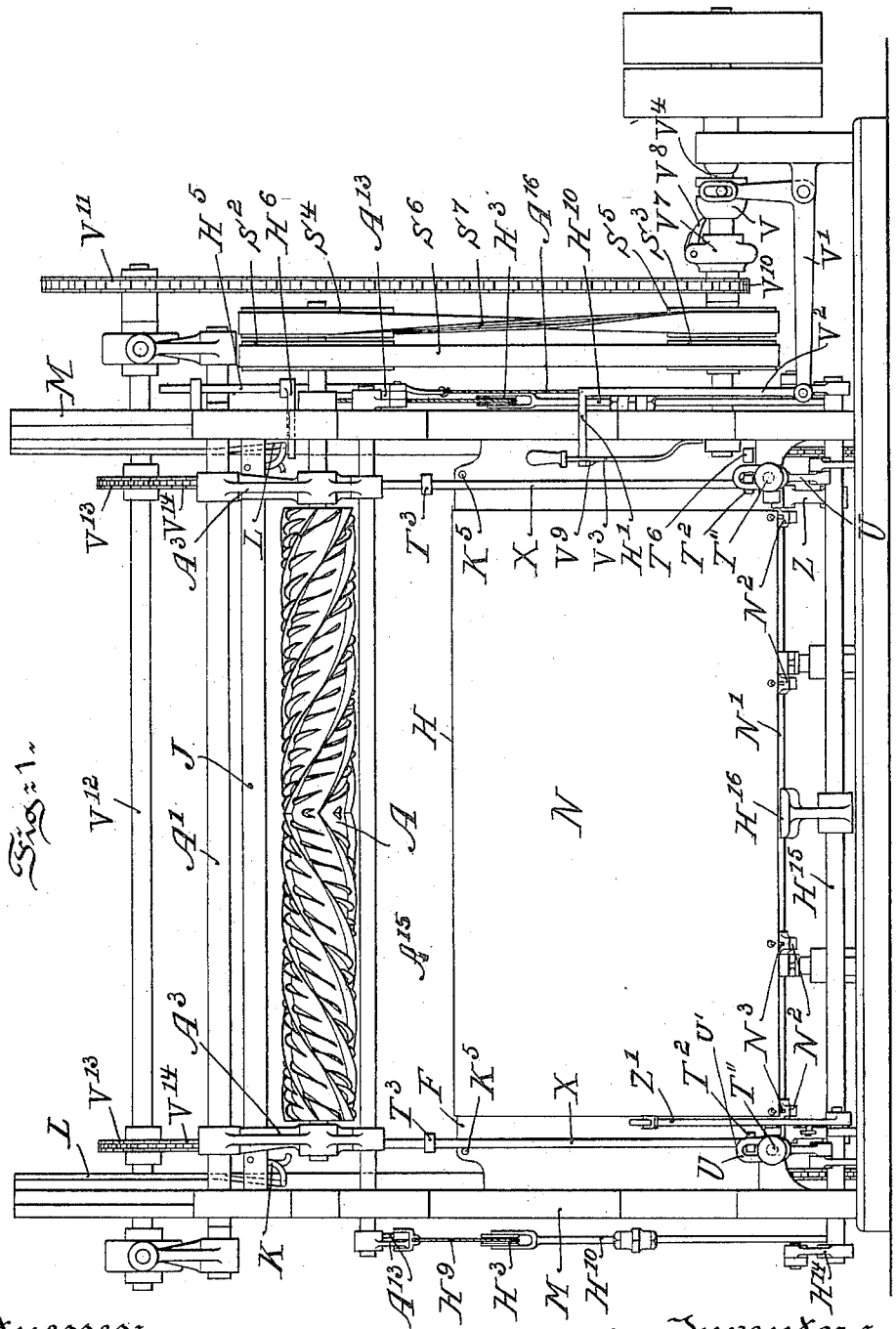
Witnesses:
Thomas M. Smith.
Richard C. Maxwell.
Inventor:
Joseph Hall,
By J. Walker Douglass
Attorney.

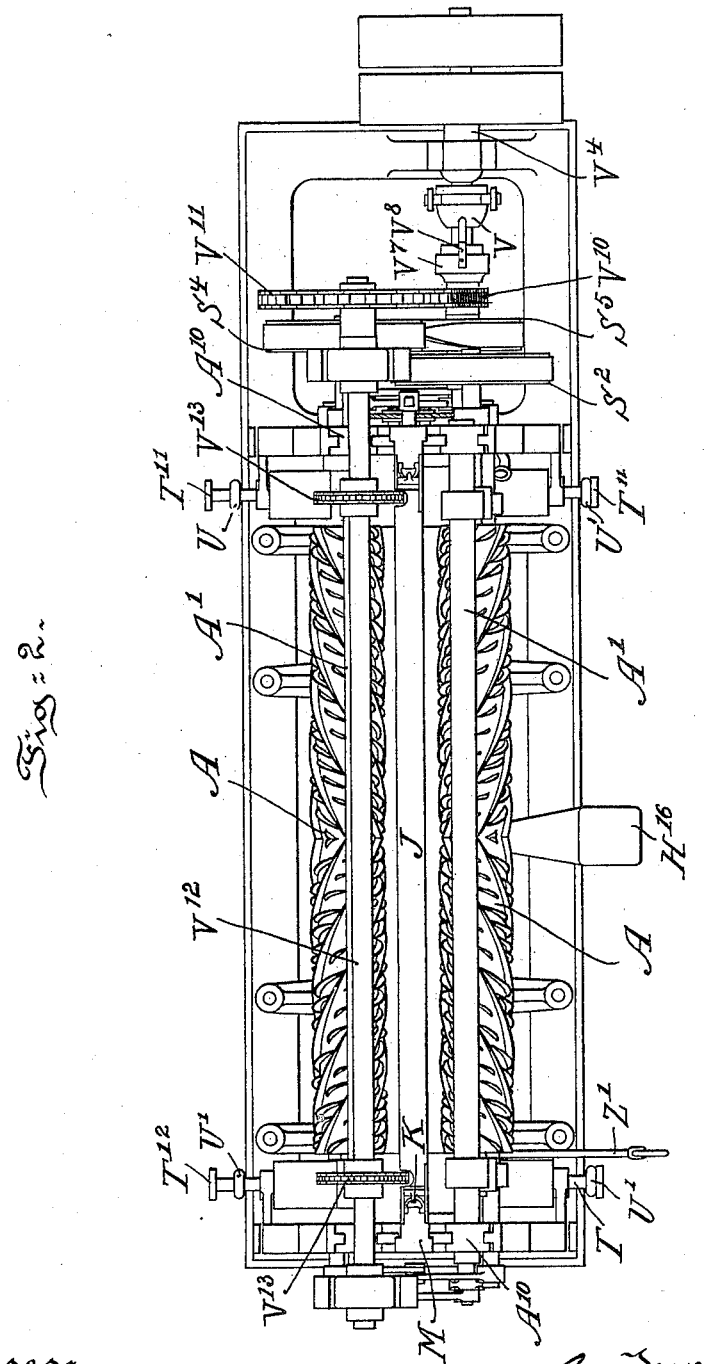

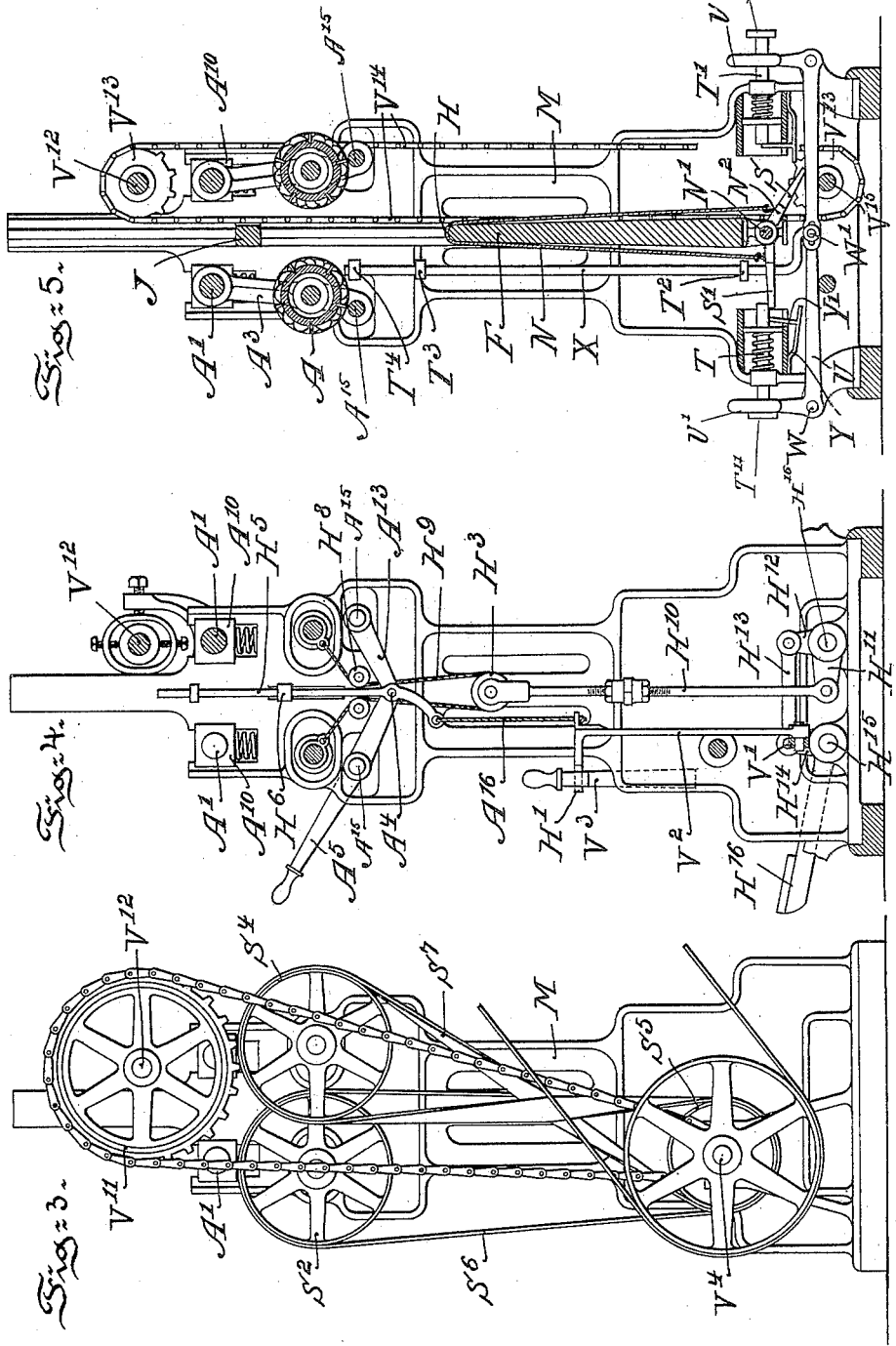

(No Model.) 5 Sheets—Sheet 4.
J. HALL.
MACHINE FOR TREATING HIDES, SKINS, OR LEATHER.
No. 599,331. Patented Feb. 22, 1898.
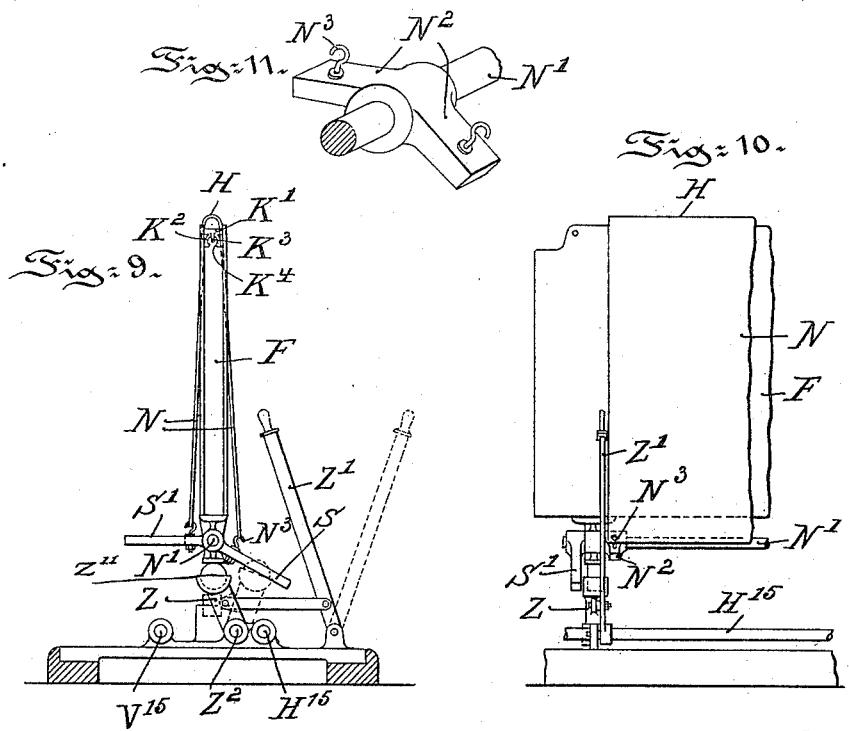
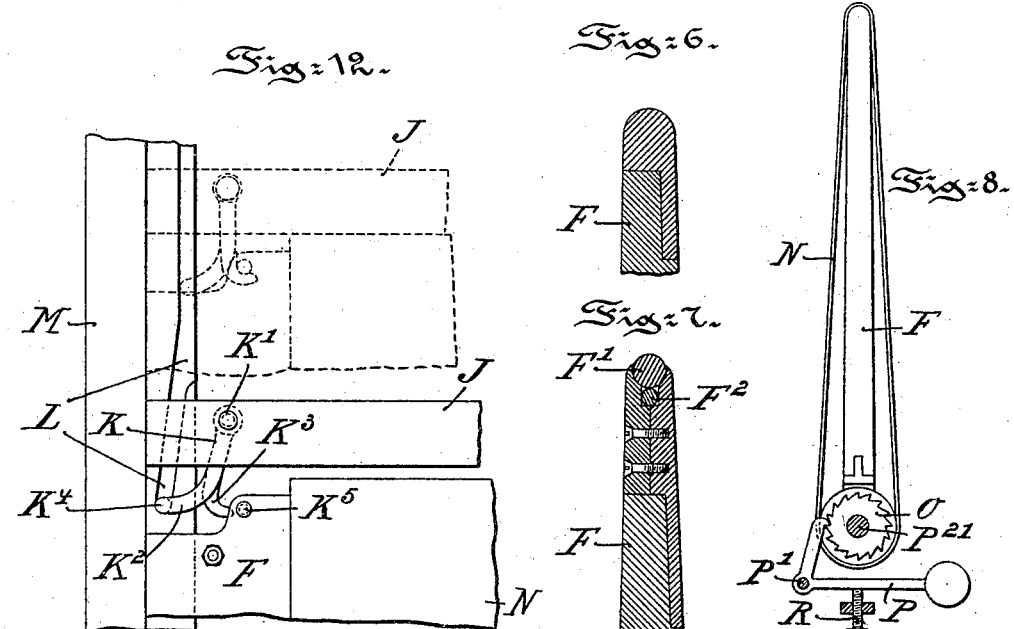
Witnesses:
Thomas M. Smith.
Richard C. Maxwell.
Inventor:
Joseph Hall,
By J. Walter Douglass
Attorney.

(No Model.)  5 Sheets—Sheet 5.

J. HALL.
MACHINE FOR TREATING HIDES, SKINS, OR LEATHER.

No. 599,331. Patented Feb. 22, 1898.

Witnesses:
Thomas M. Smith.
Richard C. Maxwell.

Inventor:
Joseph Hall,
By J. Walter Douglass.
Attorney.

UNITED STATES PATENT OFFICE.

JOSEPH HALL, OF LEEDS, ENGLAND.

MACHINE FOR TREATING HIDES, SKINS, OR LEATHER.

SPECIFICATION forming part of Letters Patent No. 599,331, dated February 22, 1898.

Application filed October 16, 1896. Serial No. 609,057. (No model.) Patented in England February 25, 1896, No. 4,199.

*To all whom it may concern:*

Be it known that I, JOSEPH HALL, a subject of the Queen of Great Britain, residing at Leeds, in the county of York, England, have invented certain new and useful Improvements in Machines for Treating Hides, Skins, or Leather, (for which I obtained Letters Patent of Great Britain, No. 4,199, dated February 25, 1896,) of which the following is a specification.

My invention has relation to a machine for treating hides, skins, or leather of the general type set forth in the United States Letters Patent No. 274,858, dated March 27, 1883; and in such connection it relates to the construction and arrangement of such a machine.

My invention, stated in general terms, consists of a machine for treating hides, skins, or leather constructed and arranged in substantially the manner hereinafter described and claimed.

The nature and scope of my invention will be more fully understood from the following description, taken in connection with the accompanying drawings, forming part hereof, in which—

Figure 13:
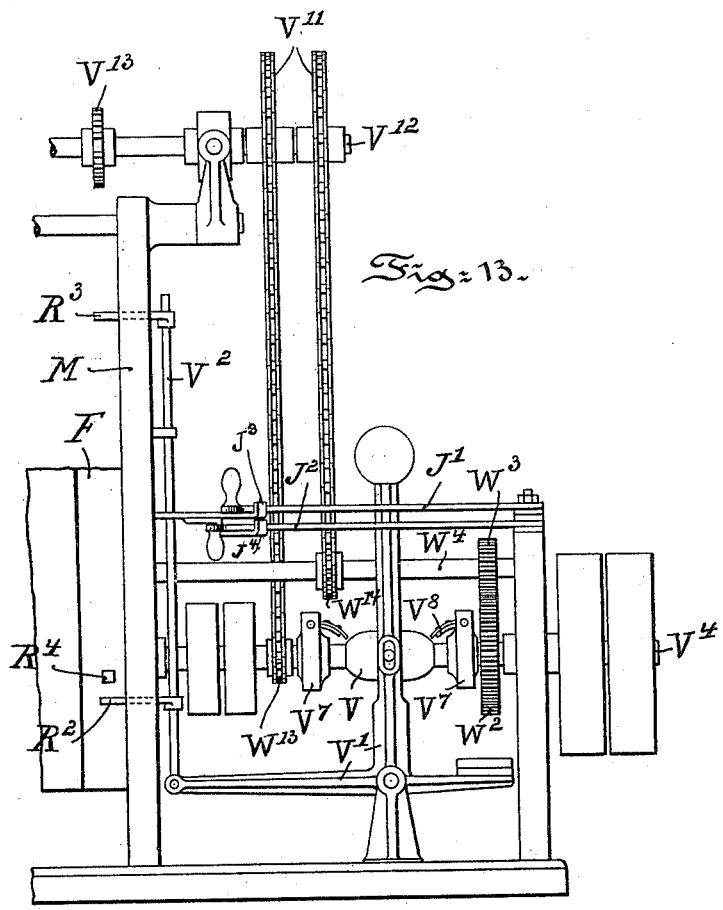
Figure 14:
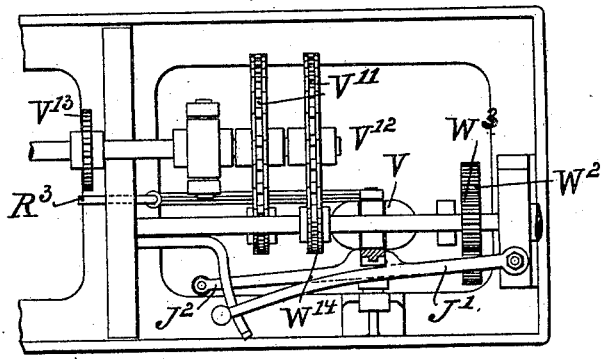

Figure 1 is a front elevation of a machine embodying main features of my invention. Fig. 2 is a top or plan view thereof. Fig. 3 is an end elevation of the machine, illustrating the mechanism for imparting motion to the vertical table and for rotating the working rolls or cylinders. Fig. 4 is an end elevation illustrating in detail the means for moving the working rolls or cylinders toward or from each other. Fig. 5 is a vertical sectional view illustrating in detail the means for shifting the apron on the vertically-movable table. Fig. 6 is an end view, enlarged, of the upper edge of the vertical table, showing the edge as solid and rounded. Fig. 7 is a similar view of the table, the upper curved edge being shown as revolving on antifriction-rolls. Fig. 8 is an end view of a modified form of table wherein the lower edge is curved and revoluble and illustrating a modified form of mechanism for shifting the apron. Fig. 9 is a vertical sectional view illustrating in detail mechanism whereby the shifting of the apron on the table may be stopped. Fig. 10 is a front elevational view of Fig. 9. Fig. 11 is a perspective view, enlarged, of one of the oscillating arms to which the lower end of the apron illustated in Figs. 1, 5, 9, and 10 is secured. Fig. 12 is a front elevational view, enlarged, of the nipping-bar and of the catch adapted to bind and release the bar to and from the upper edge of the vertical table. Fig. 13 is an enlarged front view of a modified form of the clutch mechanism illustrated in Fig. 1 for regulating the movement of the table, and Fig. 14 is a top or plan view of Fig. 13.

Referring to the drawings, A A represent the working rolls or cylinders, which are each carried by links or arms $A^3$, having swivel-bearings $A'$ in the framework of the machine. These arms $A^3$ extend below the working cylinders A A, and their extremities are pivotally secured to a shaft $A^{15}$, to which shaft the links $A^{13}$ are also pivoted, the links being also pivoted, as at $A^4$, to each other and to the vertical rod $H^5$. When this rod $H^5$ is elevated, the arms $A^3$ are swung outward away from each other, and when the rod $H^5$ is depressed the arms $A^3$ are brought closer together, the arms swinging on their bearings $A'$. Motion is imparted to the vertical rod $H^5$, at suitable intervals during the movement of the machine, either by the hand-lever $A^5$ or by mechanism hereinafter described, which is controlled by the movement of the table F. The working rolls A are driven in opposite directions from a counter-shaft $V^4$ by pulleys $S^2$, $S^3$, $S^4$, and $S^5$ and the belts $S^6$ and $S^7$, substantially as shown in Figs. 1 and 3. The bearings $A'$ of the rolls have elastic supports $A^{10}$, designed to keep the belts under proper tension.

The table F is substantially wedge-shaped in cross-section, and upon the table is placed an apron N, upon which the hide or skin is supported. Hitherto that portion H of the hide or skin which rests upon the top edge of the table was not worked by the rolls A unless the hide or skin was shifted on the apron N or table F by hand. To obviate this manifest disadvantage, the apron N is made movable on the table, and the movement of the apron N is preferably controlled by the movement imparted to the table. The table F is secured to one side of each of two endless chains $V^{14}$, operated by sprockets $V^{13}$, carried by the shafts $V^{12}$ and $V^{15}$, the shaft $V^{12}$ of which is driven, as shown in Figs. 1, 2, and 3, by a single chain-wheel or sprocket $V^{11}$, operated from the chain-wheel $V^{10}$ on the counter-shaft $V^4$. To the base of the table F are connected the arms, formed into two parts S and S', diverging or bent and secured to a rocking shaft N' below the lower edge of the table F. On this shaft N' are secured a series of brackets $N^2$, the arms of which are provided with hooks $N^3$, to which is secured the apron N, substantially as indicated in Figs. 1, 5, and 11. The arms S and S', which by preference are located at one end of the shaft N', are alternately shifted to give an intermittent or rocking motion to the shaft by means of the following preferred mechanism: Above the arms S and S' and adapted to extend in the path thereof are arranged two spring-bolts T and T', adapted to be shifted in the framework of the machine. These bolts are held in their retracted position by means of the springs Y and spring-pins Y', (shown in Fig. 5,) operated by mechanism hereinafter described.

The two bolts T and T' slide in and are operated by the angle-arms U, pivoted, as at W, and connected, as at W', to a vertical rod X, guided in a bearing $T^4$ and having a collar $T^3$. The sides of the table near the bottom edge are provided with stops $T^2$, sliding on the rods X, which when the table is elevated are adapted to come into contact with the collars $T^3$ of the vertical rods X. When, now, the table ascends, one of the arms S or S', which is in horizontal position, will abut against a bolt T or T' and the arms S and S' will be rocked, the shaft N', brackets $N^2$, and apron N being also rocked by the movement of said arms. As the table continues to ascend the stops $T^2$ thereof abut against and lift the collars $T^3$, thus raising the rods X and the levers U through their upright portions U', abutting against the heads $T^{11}$ of the spring-bolt T or T', and the bolts are withdrawn and locked by the pin Y' of the spring Y. On the descent of the table that arm S or S' which has been thrown into substantially horizontal position will strike the spring Y and release the pin Y' from the retracted bolt T or T', which will then spring into the path of the horizontal arm S or S'.

The table F, which carries the apron N, may have either a fixed curved upper edge, as indicated in Fig. 6, or a roller F', working, preferably, on antifriction-bearings $F^2$, placed in the concave upper edge of the table, as shown in Fig. 7. In Fig. 8 an arrangement is shown whereby the apron N is endless and is moved step by step by means of a ratchet O, placed, preferably, on the movable or revoluble lower edge or shaft $P^{21}$ of the table F, around which the apron is drawn. This ratchet O is operated by means of a weighted catch P, the movement of which is limited by an adjustable stop R, which preferably consists of a set-screw working in a fixed portion of the machine and located directly under the catch P. The catch P is pivoted to a fixed stud P', projecting from an upright M of the machine. On the up movement of the table the catch P will operate the ratchet O and turn the apron N. By elevating the weighted end of the catch P the catch may be released from the ratchet and no motion to the apron will be given.

The automatic movement to the apron N may be prevented, as illustrated in Fig. 9, by interposing a rocker-arm Z, carrying a spring or rubber buffer $Z^{11}$, in the path of the table to prevent its descent, so that the arms S and S' shall not come into contact with the draw-bolts T and T' or the ratchet O into engagement with the catch P. These rocker-arms Z are secured to the shaft $Z^2$ and are operated by a hand-lever Z', substantially as shown in Fig. 9.

As illustrated in Figs. 1 and 12, above the rolls A is placed a horizontally-arranged bar J, which when the vertical table F is elevated to pass the material to be treated between said rolls is designed to clamp or nip the top of the material to the table to hold the same in position thereon and to prevent the dragging of the material. This top nipping-bar J is provided at either end with a catch K, preferably pivoted, as at K', to the bar J and having two forks or arms $K^2$ and $K^3$, one of which, $K^2$, is provided with a projection $K^4$, adapted to slide in the slanting recess or notch L in the uprights M of the machine. The other fork, $K^3$, is adapted to slide under a pin or projection $K^5$ on the table F and to thus clamp the bar J down upon the material on the table. When the table ascends, it raises the bar J, and the projections $K^4$ travel upward in the grooves or notches L, thus throwing the fork $K^3$ into engagement with the projection $K^5$ and locking the bar to the table, as indicated by dotted lines in Fig. 12. On the descent of the table F and the bar J the notches L will release the forks $K^3$ from the projections $K^5$, as indicated in full lines in Fig. 12.

The mechanism for raising the table F may be controlled automatically in one of two ways, viz: The table F may be raised by the mechanism and allowed to fall by gravity or the table may be raised and lowered positively by the mechanism. In Figs. 1 and 4 the mechanism illustrated is adapted only to elevate the table, which when it reaches a certain height automatically releases a clutch to permit the table to fall by gravity.

The mechanism consists, preferably, as follows: On the counter-shaft $V^4$ is secured a boss V, operated by a forked clutch V', engaging the collar $V^{15}$, loosely mounted upon the shaft $V^4$, as shown in Fig. 14. This clutch V' is connected to a vertically-arranged rod $V^2$, which rod is coupled to or operated by the bar H'. Loosely rotating on the shaft $V^4$ is a clutch-box $V^7$, having a spring-finger $V^8$, adapted to engage the boss V and to thereby lock the clutch-box $V^7$ to said boss when the boss is operated by the clutch $V'$. Pivoted to the frame of the machine is a hand-lever $V^3$, having a latch or stop $V^9$, on which the rod or bar $H'$ rests. When the handle $V^3$ with its stop or latch $V^9$ is cleared off, the bar $H'$ will drop, and through the rod $V^2$ the clutch $V'$ will lock the boss $V$ with the clutch-box $V^7$. This clutch-box $V^7$ carries a chain-wheel $V^{10}$, operating through a chain the wheel $V^{11}$ of the shaft $V^{12}$, and thereby, as before explained, serves to raise the table F. As the table ascends the stop or latch $V^9$ is cleared from the bar $H'$ by hand, and thereafter the dropping of the bar $H'$ serves through a slack rope $A^{16}$ to depress the bar $H^5$, and through the links $A^{13}$ the rolls A are brought together to act on the hide or skin mounted on the table. The slack rope $A^{16}$ connects the bar $H'$ to the bar $H^5$, as shown in Fig. 4.

The table F is provided with a stop $T^6$, which when the table has ascended a predetermined distance will engage a stop $H^6$ on the bar $H^5$ and serves to lift said bar and to thereby separate the rolls A by means of the arms $A^{13}$. The bar $H'$, by means of the chain or cord $A^{16}$, is also lifted until the same engages the stop $V^9$ of the handle $V^3$, the handle having previously been returned either by hand or a spring (not shown) to its former position. The rod $V^2$ is correspondingly elevated until the clutch $V'$ moves the boss $V$ out of engagement with the clutch-box $V^7$ and permits the table to descend by gravity. The rolls A may also be brought together by a foot-treadle $H^{16}$, carried by the shaft $H^{15}$, which through the arm $H^{14}$, link $H^{13}$, and arm $H^{12}$ is connected with the lever $H^{11}$, the lever $H^{11}$ and arm $H^{12}$ being pivoted, as at $H^{16}$, in the frame of the machine. The lever $H^{11}$ operates through the rod $H^{10}$ a pulley $H^3$, under which passes a chain $H^9$, the ends of which are secured to the axles of the rolls A and pass over the guide-pulleys $H^8$, attached to the frame of the machine. By depressing the treadle $H^{16}$ the pulley $H^3$ is lowered and the chains $H^9$ are tightened to bring the rolls A toward each other.

In Figs. 13 and 14 an arrangement is shown whereby the table F is both positively elevated and depressed by the driving mechanism of the machine. In this arrangement there are two clutch-boxes $V^7$, between which the boss $V$ is located. The boss $V$ is connected with the clutch-lever $V'$ by a pin and slot, as shown in Fig. 13. The additional clutch-box $V^7$ to the right of the boss $V$ is geared by means of gears $W^2$ and $W^3$, the shaft $W^4$, and chain-wheels $W^{14}$ and $V^{11}$ with the shaft $V^{12}$, so as to reverse the motion of said shaft and hence to lower the table. The table has a stop $R^4$, adapted to respectively lower and raise the rod $V^2$ through the stops $R^2$ and $R^3$ thereon. When said rod is raised by the stop $R^3$ on the ascent of the table F, the boss $V$ is thrown into engagement with the right-hand clutch-box and the counter-shaft $W^4$ will lower the table. When the table descends, its stop $R^4$ engages the stop $R^2$ and lowers the rod $V^2$, and the clutch $V'$ throws the boss $V$ into engagement with the left-hand clutch-box, whereby the counter-shaft will raise the table. The clutch or lever $V'$ may be locked into substantially upright position by means of two catches $J'$ and $J^2$, which are arranged substantially as shown in Figs. 13 and 14. The catches $J'$ and $J^2$ each consist of an arm pivoted at one end to the frame of the machine and sliding over the straps $J^3$ and $J^4$. Each arm carries a lug $J^5$ or $J^6$, which is adapted to rest on either side of the lever $V'$, as indicated in Fig. 14. This arrangement for conveying positive up-and-down movement to the table operates as follows:

When the machine is standing still, both the catches $J'$ and $J^2$ are engaging the lever $V'$, thus keeping the boss $V$ out of contact with the clutches. To start the machine, one of the catches is pulled forward, allowing the weighted lever $V'$ to be directed to the left or right, as desired. For example, to start the table up the lever falls to the left, carrying the boss $V$ into contact with the spring-finger $V^8$, thus causing the clutch $V^7$ to fasten the chain-wheel $W^{13}$ to the counter-shaft $V^4$. This wheel $W^{13}$ drives a chain-wheel $V^{11}$ on the shaft $V^{12}$, on which shaft are chain-wheels, as before, to raise the table. When the table ascends, the stop $R^4$ comes in contact with the stop $R^3$, which may have a spring or india-rubber buffer, and lifts it, thus causing the rod $V^2$ to raise the lever $V'$ and cause it to fall to the other side, carrying the boss $V$ out of contact with the left-hand clutch, whereupon the upward motion of the table stops and comes into contact with the right-hand clutch. This locks the spur-wheel $W^2$ to the counter-shaft $V^4$, thus driving the wheel $W^3$ on the shaft $W^4$ in the opposite direction, and by the chain-wheel $W^{14}$ on the shaft $W^4$ drives the table down at any desired speed, according to the spur-gearing. At the bottom of the stroke the stop $R^4$ meets the stop $R^2$ and again throws the lever $V'$ and boss $V$ to the right, or if both the catches $J'$ and $J^2$ have been pushed in the lever $V'$ falls into and is locked against movement in the middle position and the motion stops. Sufficient space is left between the bosses $V$ and the clutch-fingers $V^8$ to allow the lever $V'$ to swing fairly over the center, so that the weight on the lever will cause it to engage with the clutch-fingers $V^8$ with sufficient force to drive the machine.

Having thus described the nature and objects of my invention, what I claim as new, and desire to secure by Letters Patent, is—

1. In a machine of the character described, a vertically-movable table upon which the work is placed, a horizontally-arranged bar adapted to be raised by the upper edge of the table, a catch pivotally connected at each end of the bar, means controlled by the movement of the bar for oscillating said catch about its pivot, and a pin arranged at either side of the upper edge of the table and adapted to be engaged by the catch upon the upward movement of the table and bar, and thereby lock said bar to said table, substantially as and for the purposes described.

2. In a machine of the character described, two working rolls or cylinders, a vertically-arranged table, means for raising and lowering said table between said rolls, an endless apron carried by said table, means for shifting said apron on the table while the table is below said rolls, a horizontally-arranged bar adapted to be raised by said table and located above the working rolls, a catch pivoted at either end of said bar, means controlled by the movement of the bar for oscillating the catch about its pivot and a pin arranged at either side of the upper edge of said table, all arranged so that when the bar is raised by the table, the catches will engage said pins and thereby lock the bar to the table, substantially as and for the purposes described.

JOSEPH HALL.

Witnesses:
HERBERT DUNN,
SIDNEY H. BAINES.